United States Patent Office 3,578,587
Patented May 11, 1971

3,578,587
COLOR REMOVAL PROCESS
Frank N. Kemmer, La Grange, Ill., assignor to Nalco Chemical Company, Chicago, Ill.
No Drawing. Filed Jan. 5, 1970, Ser. No. 815
Int. Cl. C02c 5/02
U.S. Cl. 210—52                4 Claims

ABSTRACT OF THE DISCLOSURE

The amount of lime necessary to remove color from paper mill waste waters can be susbtantially reduced when the lime is used in combination with certain water-soluble anionic polymers.

INTRODUCTION

The amount of organic material in the form of BOD, COD, and color bodies currently being discharged into public water supplies is a problem of increasing importance in water pollution.

Pulp and paper mills have highly colored effluents with large BOD and COD values. Investigation of this industry indicated that the Kraft process of pulping yields the most highly colored effluent. The bleaching of Kraft mill pulp, in particular the caustic extract effluent, is the greatest contributor to this pollution problem.

Lignin is the major source of color in the pulp. Chlorination of the pulp during the bleaching operation results in solubilization of the lignin in an alkaline wash solution. Thus the caustic extract effluent contains a major portion of the color bodies and other organics being dumped into the waste stream.

A process now advocated for removing color from paper mill waste is the so-called "massive lime process." This process utilizes lime in quantities ranging from 5,000–20,000 p.p.m. to remove by coagulation and sedimentation techniques the organic colored bodies from paper mill wastes. The process has shown it capable of removing more than 90% of the color and up to 50% of BOD from Kraft and other paper-making waste streams. The process generally comprises slaking lime and reacting it with highly colored caustic bleach effluent waste waters. The reaction forms a sludge which is settled, dewatered, and used to causticize additional green liquor in the fresh cooking liquor makeup. The clarified and decolorized effluent is then carbonated to precipitate and recover dissolved calcium.

Since the pH of the lime process effluent is greater than 9.5, neutralization to below 8.0 is normally required. This neutralization step is necessary for subsequent biooxidative processes to be used on the treated effluent.

The massive lime treatment briefly described above is set forth in much greater detail in the following publications:

Massive Color Removal System Being Constructed by International Paper Company, Southern Pulp and Paper Manufacurer, pages 26–30, April 10, 1969.
Smith, Donald R., and Berger, Herbert F.: "A Chemical Physical Wastewater Renovation Process for Kraft Pulp and Paper Wastes," Journal Water Pollution Control Federation, 40, 1575 (1968).

It has been shown experimentally that color removal of 80–85% may be obtained using 2,000 p.p.m. of lime in the above described process. However, the filterability of the sludge is very poor. That is one reason why the massive lime treatment uses up to 20,000 p.p.m. of lime. It would be beneficial to the lime color removal process described if it were possible to use substantially small dosages of lime, yet at the same time improve the characteristics of the sludge produced by the process.

OBJECTS OF THE INVENTION

It is an object of the invention to provide an improved massive lime treatment process for removing color from paper mill waste waters whereby the amount of lime used is substantially reduced without sacrificing quality of the precipitated sludge. Other objects will appear hereinafter.

INVENTION

In accordance with the invention it has been found that the amount of lime needed to remove color from paper mill waste waters may be reduced without sacrificing the quality of the finished effluent by using in combination with the lime 0.01 up to 500 p.p.m. of a water-soluble anionic polymer, whose molecular weight is at least 100,000. As will be shown hereinafter, as little as 0.1 p.p.m. up to 10 p.p.m. can reduce the needed amount of lime in removing color from paper mill waste waters from 20,000 p.p.m. to as little as 2,000 p.p.m.

The polymer may be added to the paper mill waste waters either before, during, or after the lime treatment. In a preferred embodiment it is added simultaneously with the lime.

THE ANIONIC WATER-SOLUBLE POLYMERS

The anionic water soluble polymers used in the practice of the invention are formed by the polymerization of at least one mono-olefinic compound through an aliphatic unsaturated group. The polymers may be either copolymers or homopolymers and, as indicated, should have as a minimum molecular weight of at least 100,000. In a preferred practice of the invention, the molecular weight of these polymers is at least 1 million with molecular weights in excess of 1 million also being suitable for use. In most cases the upper practical molecular weight limit is about 30,000,000.

The anionic water soluble polymers of the type generically described are composed of at least 10% by weight of at least one monomer which contains an anionic hydrophilic side chain group. Thus the polymers may be said to contain in a side chain grouping such anionic radicals as carboxylic acid, carboxylic anhydride groups, carboxylic acid salt groups, sulfonic acid groups, phosphonus and phosphonic acid and salt groupings.

The most readily prepared polymers that give the best results are the copolymers and homopolymers of acrylic acid which contain at least 10% by weight of acrylic acid or acrylic acid salts.

A particularly useful group of copolymer of acrylic acids are those which contain 20–60% by weight of acrylic acid, and from 40–80% by weight of acrylamid with such polymers having a preferred molecular weight range between 1–3 million. To illustrate preparation of a typical polymer of acrylamid and acrylic acid, the following is presented by way of example.

Example I

This example illustrates preparation of a copolymer comprised of 30% sodium acrylate monomer and 70% acrylamide.

27 parts by weight of acrylic acid was dissolved in 72 parts of water and cooled to a temperature below 35° C. The above solution temperature was maintained while neutralization with sodium hydroxide was effected. Addition of 30 parts by weight of a 50% solution of sodium hydroxide was necessary to carry out this step. A solution pH of 7–9 was reached after neutralization.

63 parts by weight of acrylamide were then added to the above solution and mixed until dissolved at a solution temperature of 20–30° C. 33 additional parts by weight of water were added and the pH of the monomer solution adjusted to 8.5. 0.8 part of a 1% solution of potassium persulfate were added with stirring to the monomer solution. This was followed by addition of 3.2 parts of a 1% solution of sodium metabisulfite. Into the reaction vessel itself was added 575.0 parts by weight of toluene and 19.6 parts by weight of sorbitan monooleate nonionic emulsifier. To the toluene solution was added the monomer solution containing catalyst and the temperature increased to 75° C.

The reaction vessel was purged with nitrogen and an exothermic reaction was then initiated. After the exothermic reaction ceased, the mixture was cooled at 63° C., and additional catalyst added. Specifically, 15.6 parts of a 1.15% solution of azobisisobutyronitrile in toluene were added to the reaction mixture. The nitrogen purge was continued and the temperature held at 63° C., until another exothermic reaction was completed (approximately 30 minutes after initiation). After the second exothermic reaction, water was distilled off by azeotropic distillation, and the solid product isolated by filtration. A 1% solution of the final copolymeric composition had a viscosity of 22,500 cps. The molecular weight of this polymer was slightly greater than 1,000,000.

Thus, the preferred polymers of the invention are prepared from monomers having the molecular grouping:

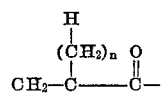

wherein $n$ is an integer from zero (0) to one (1) inclusive.

Another useful group of polymers of anionic copolymers whose starting monomers contain the grouping:

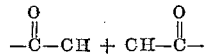

Illustrative of such polymers are copolymers of maleic anhydride, maleic acid, fumaric acid, itaconic acid, aconitic acid, citraconic acid, the partial amides of these acids, the alkali metal (e.g., sodium, potassium and lithium), the alkaline earth metal (e.g., magnesium calcium, barium and strontium), and ammonium salts of these acids, the partial alkyl esters (e.g., methyl, ethyl, propyl, butyl, mono esters), the salts of said partial alkyl esters, and the partial substituted amides of these polycarboxylic acids. Where the hydrophilic maleic acid derivatives are used as one of the starting components to form the copolymer, the hydrophobic comonomers may be, for example, styrene, alphamethylstyrene, vinyl toluene, chlorostyrene, vinyl acetate, vinyl chloride, vinyl formate, vinyl alkyl ethers, alkyl acrylates, alkyl methacrylates, ethylene, propylene, and/or isobutylene.

Other polymers that may be employed are those polymers which contain in a side chain grouping, a sulfonic phosphonic or phosphonus acid grouping, either as the free acid or in the form of a water-soluble cation salt. Illustrative are the well-known polystyrene sulfonic acids. Also illustrative are the phosphorylated polystyrenes.

In certain instances it is possible to use homo or copolymers of acrylamides which are not, per se, anionic, but under certain conditions of pH as will be more fully described hereinafter, are capable of being hydrolized to convert the amide grouping into a carboxylic acid salt grouping, thereby rendering the starting polymer anionic under conditions of use.

To further illustrate typical polymers useful in the practices of the invention, Table I is presented below:

TABLE I

| Number | Name | Characteristic grouping |
|---|---|---|
| 1 | Polyacrylate-sodium salt | $-CH_2-CH-$ <br> $\quad\quad\;\; |$ <br> $\quad\quad COO(-)$ <br> $\quad\quad\;\; Na(+)$ |
| 2 | Polymethacrylic acid-sodium salt | $\quad\quad CH_3$ <br> $\quad\quad\;\; |$ <br> $-CH_2-C-$ <br> $\quad\quad\;\; |$ <br> $\quad\quad COO(-)$ <br> $\quad\quad\;\; Na(+)$ |
| 3 | Maleic anhydride-vinyl acetate copolymer | $-CH-CH_2-CH--CH-$ <br> (with acetate and anhydride groups) |
| 4 | Polyvinyl methyl ether-maleic anhydride copolymer | $-CH-CH_2-CH--CH-$ <br> $\;\; OCH_3 \;\; O=C \quad C=O$ <br> $\quad\quad\quad\quad\quad \backslash O /$ |
| 5 | Methacrylic acid-acrylamide copolymer | $\quad CH_3 \quad\quad CH_3$ <br> $\quad\;\; | \quad\quad\quad |$ <br> $-CH_2C-CH_2-C-$ <br> $\quad\;\; | \quad\quad\quad\;\; |$ <br> $\;\; COO(-) \;\; C-ONH_2$ <br> $\;\;\; H(+)$ |
| 6 | Polyacrylic acid | $-CH_2-CH-$ <br> $\quad\quad\;\; |$ <br> $\quad\quad COO(-)$ <br> $\quad\quad\;\;\; H(+)$ |
| 7 | Isopropenyl acetate-maleic anhydride sodium salt | $\quad CH_3$ <br> $\quad\;\; |$ <br> $CH_2-C---CH--CH$ <br> (with acetate groups and $COO(-)Na(+)$ salts) |
| 8 | Itaconic acid-vinyl | $COO(-)H(+)$ <br> $\quad\;\; |$ <br> $-C-CH_2-CH_2-CH-$ <br> $\;\; CH_2COO(-) \quad O$ <br> $\quad\;\; H(+) \quad\quad\quad |$ <br> $\quad\quad\quad\quad\quad CH_3C=O$ |

TABLE I—Continued

| Number | Name | Characteristic grouping |
|---|---|---|
| 9 | α-Methyl styrene-maleic anhydride sodium salt | $CH_3$ group: $-C(CH_3)(C_6H_5)-CH_2-CH(COO^-Na^+)-CH(COO^-Na^+)-$ |
| 10 | Styrene-maleic anhydride | $-CH(C_6H_5)-CH_2-CH(COO^-Na^+)-CH(COO^-Na^+)-$ |
| 11 | Methylmethacrylate-maleic anhydride sodium salt | $-C(CH_3)(COOCH_3)-CH_2-CH(COO^-Na^+)-CH(COO^-Na^+)-$ |
| 12 | Acrylic acid | $-CH(C_6H_5)-CH_2-CH(COO^-H^+)-CH_2-$ |

Also see the disclosures and discussions of anionic polymers appearing in U.S. 3,377,274 and U.S. 3,374,143 which are incorporated herein by reference.

The polymers of the invention are most suitably used in the form of dilute aqueous solutions whose solution strength ranges between 0.1%–5% by weight. Such solutions are prepared in separate mixing vessels and then used to treat the aqueous suspensions described.

EVALUTION OF THE INVENTION

To illustrate the advantages of the invention a typical Kraft mill waste water was used. This particular waste had a pH of 10.9, a total dissolved solids of 1400, and a APHA color of 4,000. It was further observed that large amounts of fibers were present. The following experiments were conducted with lime and the polymers described in Example I. The results of these tests are set forth in Table II.

TABLE II.—COAGULANTS WITH COAGULANT AIDS

| Test No. | Lime dosage | Anionic water soluble polymers, p.p.m. | pH | Color removed | Remarks |
|---|---|---|---|---|---|
| 1 | 2,000 | 0 | 8.5 | −80 | Voluminous sludge; hanging floc. |
| 2 | 20,000 | 0 | 11.5 | +82 | Good floc; compact sludge. |
| 3 | 2,000 | 2 | 8.6 | +83.0 | Do. |

CONCLUSIONS

From the above it is seen that the anionic water soluble polymers produce good color removal and allow a minimum amount of lime to be effectively used.

I claim:

1. In a process for removing color from paper mill waste waters wherein said waters are treated with massive dosages of about 20,000 p.p.m. of lime under conditions whereby the color is removed as a precipitated sludge, the improvement which comprises using a substantially reduced amount of lime, said reduced amount of lime comprising not more than about 2,000 p.p.m., in combination with from 0.01 up to 500 p.p.m. of an anionic water-soluble polymer whose molecular weight is at least 100,000.

2. The process of claim 1 where the anionic water-soluble polymer is an acrylic acid polymer.

3. The process of claim 2 where the acrylic acid polymer is an acrylamide-acrylic acid copolymer which contains at least 10% by weight of acrylic acid.

4. The process of claim 3 where acrylamide-acrylic acid copolymer contain 30% by weight of acrylic acid.

References Cited

UNITED STATES PATENTS 3,120,464   2/1964   Berger et al. _____ 162—33

FOREIGN PATENTS 816,399   7/1959   Great Britain _____ 210—52

OTHER REFERENCES

Cohen, J. M., et al.: Natural and Synthetic Polyelectrolytes as Coagulant Aids, vol. 50, April 1958, pp. 463–478.

Smith, D. R., et al.: A Chemical-Physical Wastewater Renovation Process for Kraft Pulp and Paper Wastes, Jour. WPCF, vol. 40, September 1968, pp. 1575–1581.

Massive Color Removal System Being Constructed by International Paper Company, Southern Pulp and Paper Manufacturer, pp. 26–30, Apr. 10, 1969.

MICHAEL ROGERS, Primary Examiner

U.S. Cl. X.R.

162—29; 252—181